United States Patent [19]

Deters et al.

[11] Patent Number: 4,797,062

[45] Date of Patent: Jan. 10, 1989

[54] DEVICE FOR MOVING GAS AT SUBATMOSPHERIC PRESSURE

[75] Inventors: Ludger Deters, Cologne; Heinrich Engländer, Linnich; Hans-Peter Kabelitz; Günter Schütz, both of Cologne, all of Fed. Rep. of Germany

[73] Assignee: Leybold-Heraeus GmbH, Cologne, Fed. Rep. of Germany

[21] Appl. No.: 111,150

[22] Filed: Oct. 20, 1987

Related U.S. Application Data

[63] Continuation of Ser. No. 713,993, Mar. 20, 1985, abandoned.

[30] Foreign Application Priority Data

Mar. 24, 1984 [DE] Fed. Rep. of Germany ....... 3410905

[51] Int. Cl.$^4$ .............................................. F01D 1/36
[52] U.S. Cl. ...................................... 415/90; 415/177
[58] Field of Search ............. 415/90, 134, 137, 170 R, 415/170 B, 177, 178, 179

[56] References Cited

U.S. PATENT DOCUMENTS

| | | | |
|---|---|---|---|
| 3,628,894 | 12/1971 | Ferguson | 415/90 |
| 3,832,084 | 8/1974 | Maurice | 415/90 |
| 3,947,193 | 3/1976 | Maurice | 415/90 |
| 4,180,370 | 12/1979 | Klatt et al. | 415/90 |
| 4,270,882 | 6/1981 | Luijten et al. | 415/90 |
| 4,332,522 | 6/1982 | Saulgeot | 415/90 |
| 4,502,832 | 3/1985 | Becker | 415/107 |
| 4,512,725 | 4/1985 | Saulgeot | 415/90 |

FOREIGN PATENT DOCUMENTS

| | | | |
|---|---|---|---|
| 317531 | 12/1919 | Fed. Rep. of Germany | 415/177 |
| 625444 | 2/1936 | Fed. Rep. of Germany | . |
| 605902 | 11/1936 | Fed. Rep. of Germany | . |
| 912007 | 5/1954 | Fed. Rep. of Germany | . |
| 2255618 | 5/1973 | Fed. Rep. of Germany | . |
| 2214702 | 9/1973 | Fed. Rep. of Germany | 415/90 |
| 2412624 | 10/1974 | Fed. Rep. of Germany | . |
| 2409857 | 11/1975 | Fed. Rep. of Germany | 415/90 |
| 3001134 | 7/1980 | Fed. Rep. of Germany | . |
| 731221 | 2/1941 | France | 415/90 |
| 33446 | 8/1972 | Japan | 415/90 |
| 212395 | 12/1982 | Japan | 415/90 |
| 182394 | 9/1985 | Japan | 415/90 |
| 101871 | 10/1923 | Switzerland | . |
| 222288 | 12/1942 | Switzerland | . |
| 533757 | 12/1976 | U.S.S.R. | 415/90 |
| 227938 | 1/1925 | United Kingdom | 415/134 |
| 332879 | 12/1929 | United Kingdom | . |

OTHER PUBLICATIONS

Theorie und Praxis der Vakuumtechnik (Theory and Practice of Vacuum Technology), by Wutz, Adam and Walcher, pp. 202 to 212.

Primary Examiner—Robert E. Garrett
Assistant Examiner—John T. Kwon
Attorney, Agent, or Firm—Felfe & Lynch

[57] ABSTRACT

A device for moving a gas at a subatmospheric pressure with a screwthread-like device on at least one of the facing surfaces of a rotor spacedly surrounded axially by a relatively-rotatable stator insulates the stator from a housing for the device to prevent thermal variation of the space between the rotor and stator and, thus, keeping the gas-moving action constant.

17 Claims, 3 Drawing Sheets

DEVICE FOR MOVING GAS AT SUBATMOSPHERIC PRESSURE

This application is a continuation of application Ser. No. 713,993 filed Mar. 20, 1985 now abandoned.

BACKGROUND OF THE INVENTION

The invention relates to a device for moving a gas at subatmospheric pressure.

A known device for moving a gas at subatmospheric pressure has a rotor in a stator in a housing. The rotor and/or the stator is provided with a screwthread-like structure which moves a gas between the rotor and stator when they relatively rotate.

From published German patent application DOS No. 22 55 618, it is known that devices of this type may have different functions, depending on their design. In one function, they form a stage of a vacuum pump; in another function, they serve as a molecular or viscous seal.

When the device forms a stage of a vacuum pump, it is usually known as a molecular pump. This is classed as a drag pump, the principle of operation of which in relation to a turbomolecular pump is described on pp. 202 et seq. of the textbook *Theorie und Praxis der Vakuumtechnik* (Theory and Practice of Vacuum Technology), by Wutz, Adam and Walcher. In general, a moving rotor surface and a stationary stator surface are so designed and spaced apart that the impulses transmitted by the surfaces to gas molecules preset between them have a preferential direction. As a rule, this is done by providing the rotor and/or the stator surface(s) with screwthread-like spiral or helical recess or projection structure for obtaining the preferential direction. Molecular pumps operating on this principle are known from German patent Nos. 605,902, 625,444 and 912,007, from Swiss patent Nos. 101,871 and 222,288, and from British patent No. 332,879. Moreover, a combination molecular and turbomolecular pump is known from published German patent application DOS No. 24 12 624.

Published German patent applications DOS Nos. 22 555 618 and 30 01 134 give examples showing the device as a molecular or viscous seal. As such, it serves for tightly sealing a space that is below atmospheric pressure, i.e., under vacuum. In such application, the depth and width of the screwthread-like structure usually are made considerably smaller than in the former application because these quantities affect the gas-moving efficiency which, in the case of the sealing function, can be low.

It is apparent from the art described that such devices have been proposed in many different varieties and designs for molecular pumps and seals. Nevertheless, they have failed, so far, to gain market acceptance. The main reason for this lies in technological difficulties connected with their construction. Above all, the clearance between the relatively-moving rotor and stator surfaces must be extremely small to limit backstreaming, and the temperature sensitivity of such devices is a definite drawback in this regard. With pronounced temperature variations, the relatively-moving rotor and stator surfaces may come into contact on account of their small clearance. Moreover, even minor temperature variations thermally change the rotor and/or stator dimensions enough to change markedly their small clearance. Both result in significantly altered pumping or sealing characteristics.

The changes in the operating conditions which thus occur as a result of even minor temperature variations have an adverse effect on the operating behavior. With turbomolecular vacuum pumps, such difficulties are less pronounced, which is why they have been most successful in maintaining their market position for the last ten years or so, but these factors explain why the advantages offered by molecular pumps and seals have not been exploited commercially up to now. These advantages are, in the main, that a molecular pump or seal can be used over a wide range of pressures. Molecular vacuum pumps, for example, have good pumping characteristics, not only in the molecular flow region (high and ultrahigh vacuum), but also and especially in the viscous flow region (medium-high and low vacuum).

SUMMARY OF THE INVENTION

The object of the present invention is, therefore, to provide a device of the type mentioned at the outset in which the difficulties described above are not encountered.

In accordance with the invention, this object is accomplished by thermally insulating a rotor-containing stator from a housing which surrounds it. One result of this mesasure is that sudden changes in the outside temperatures have no direct affect on the stator, and the risk of the rotor and stator surfaces thermally moving relative to each other or coming into contact is, therefore, eliminated. Because of the high thermal resistance between the stator and the outer housing, the rotor and the stator can heat up at the same rate so that the clearance between their facing surfaces is temperature-independent.

The heat insulation between the stator and the outer housing is preferably formed by an evacuated annular clearance. Such "vacuum" insulation provides particularly effective thermal isolation of the stator and housing.

A particularly-practical solution is a design in which the stator is a bushing-like construction separate from the housing and supported therein, in proximity to its end faces, through resilient cylindrical sections also forming the annular clearance. With temperature variations, the stator is able to "expand" into this annular clearance, with the result that its gas-moving clearance relationship to the rotor does not change, or changes only very slightly. A uniform rate of the temperature variation of stator and rotor also helps this. When the masses of rotor and stator are made approximately equal, the desired uniform rate of temperature variations is assured.

BRIEF DESCRIPTION OF THE DRAWINGS

Drawings, from which further advantages and details of the invention will now be described with reference to preferred embodiments which illustrate but do not limit the invention, show in.

DETAILED DESCRIPTION OF THE INVENTION

Figure 1:
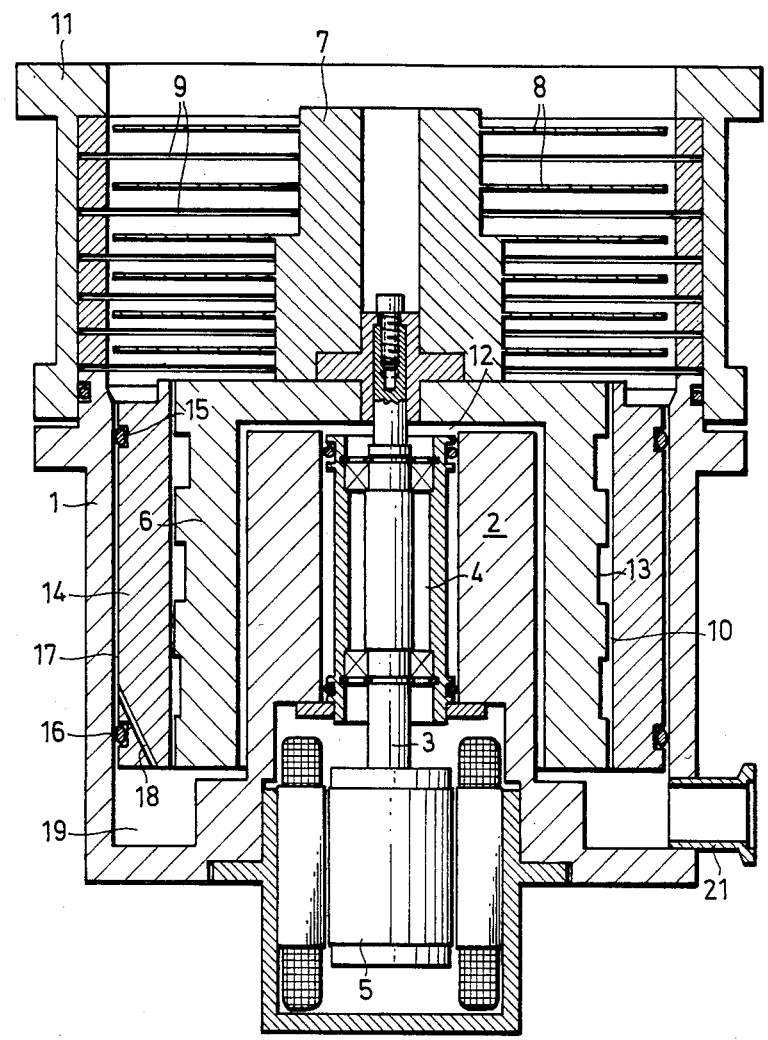
FIG. 1 an axial elevation, partly in section, of one preferred embodiment.

In all figures, a housing is designated 1. It is provided with a central, inwardly projecting bearing sleeve 2 in which a shaft 3 is supported by means of a spindle bearing 4. Coupled to one end of the shaft 3 is a drive motor 5 and, to the other end, at least one rotor, the rotor 6 of each FIG. being for a molecular-pump stage and the rotor 7 of FIGS. 1 and 3 being for a turbomolecular-pump stage.

Figure 3:
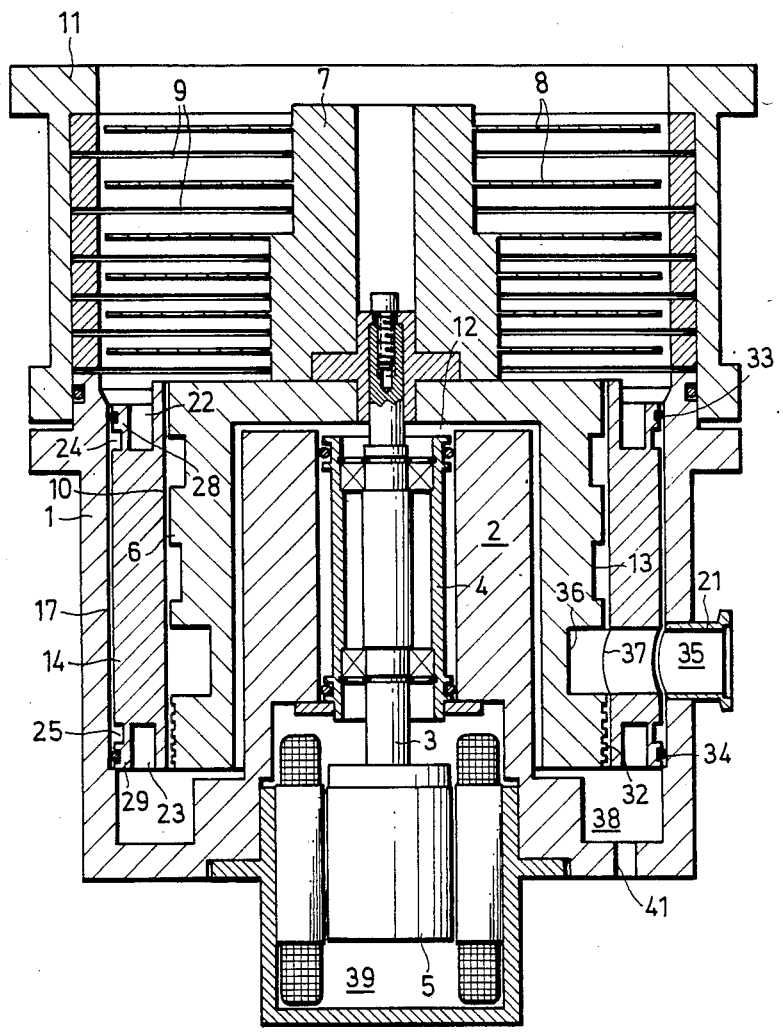
FIG. 3 an axial elevation, partly in section, of still another preferred embodiment.

The rotor 7 of FIGS. 1 and 3 is provided with blades 8 which, together with stator blades 9 held in the housing 1, form the turbomolecular-pump stage. The pump is connected by a flange 11 to a vessel (not shown) to be evacuated through pipe 21.

The rotor 6 of the molecular-pump (or pump stage) of each FIG. is bell shaped to extend over a bearing space 12 for the sleeve 2, shaft 3, and bearing 4. It is provided externally with screwthread-like grooves 13 in which the gas is moved from the high-vacuum side of the pump at flange 11 to the fore-vacuum side of the pump at pipe 21 when the motor relatively rotates the rotor 6 and its stator 14 for pump operation. The stator 14 is of approximately the same axial length as the rotor 7 and is constructed like a bushing that is spaced from the housing 1 and, of course, the rotor 6. The clearance 10 between the stator 14 and the rotor 6 must be as small as possible or achieving effective sealing axially between turns of a screwthread-like groove 13 along the rotor.

In the embodiment shown in FIG. 1, the bushing-like stator 14 is supported in the housing near its end faces by insulating O rings 15 and 16 in such a way that an annular clearance 17 is formed between the stator and housing. The clearance 17 communicates with a fore-vacuum space 19 through a bore 18 so that, when the pump is in operation, vacuum thermal insulation is provided between housing 1 and stator bushing 14. The fore-vacuum pipe 21 is connected to the fore-vacuum space 19.

Figure 2:
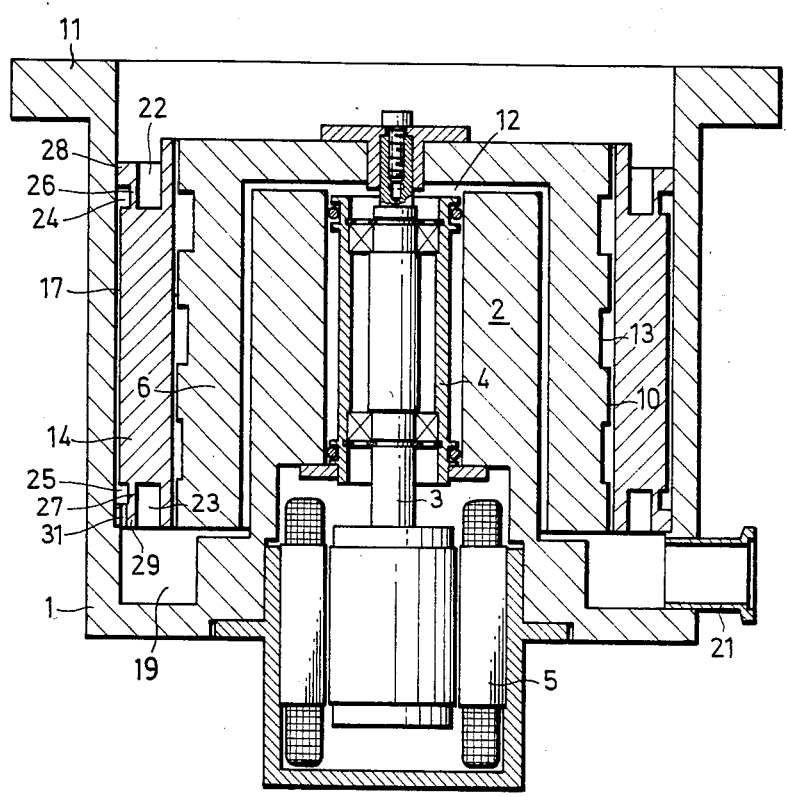
FIG. 2 an axial elevation, partly in section, of another preferred embodiment.

In the embodiment shown in FIG. 2, the bushing-like stator 14 forms it own support elements. For this, its end faces have axial grooves 22 and 23 which respectively cooperate with adjacent, external, radial grooves 24 and 25 in such a way that cylindrical regions 26 and 27, respectively, of reduced, resilient sections are formed. The flow of heat through these regions is, therefore, slight to negligible. The edges 28 and 29 of the bushing-like stator between the axial and radial groove pairs have an outside diameter that is somewhat larger than that of the main portion of the stator 14 between the radial grooves so that the latter is supported only by its edges 28 and 29 in the housing 1 and an annular clearance 17 is formed therebetween. The edge 29 has a bore 31 therethrough to the fore-vacuum space 19 for evacuating the annular clearance 17 for insulation.

The embodiment shown in FIG. 3 comprises a molecular-pump stage, formed by the screwthread-like groove 13 in the upper section of the rotor 6 and the stator 14, and a viscous seal, formed by the screwthread-like groove 32 in the lower section and stator 14, arranged axially in tandem.

As in the embodiment shown in FIG. 2, the stator 14 shared by the molecular-pump stage and the viscous seal is provided with radial and axial grooves 22 and 25 in its end portions. In contrast to the stator 14 of FIG. 2, however, the edges 28 and 29 do not have an enlarged outside diameter for supporting the stator. Instead, the stator is supported in the housing 1 by O rings 33 and 34.

The embodiment shown in FIG. 3 is designed so that the fore-vacuum connection of pipe stub 21 is disposed between the molecular-pump stage and viscous seal. The fore-vacuum space 35 is formed by a groove 36 cut into the rotor 6 and by a bore 37 in the stator 14 which adjoins the fore-vacuum pipe stub 21. In the space 38 beneath the stator 14 and the rotor 6, atmospheric pressure prevails. The fore-vacuum space 35 is sealed thereagainst by the viscous seal (screw thread 32 in cooperation with the stator 14) and O ring 34. Atmospheric pressure also prevails in the bearing space 12 over which the bell-shaped rotor 6 extends and in the motor space 39, so that lubrication and cooling of these components poses no problems. A bore 41 in the housing 1 provides a connection to the atmosphere for this.

As can be seen from FIG. 3, there is a clearance 10 between the stator 14 and the rotor 6 not only at the screwthread-like grooves 13 along the rotor but also at the screwthread 32 at the lower section of the rotor 6. The minimum clearance space between the screwthread section 32 and stator 14 corresponds in dimension with that between the stator and the rotor.

It will be appreciated that the instant specification and claims are set forth by way of illustration and not of limitation, and that various changes and modifications may be made without departing from the spirit and scope of the present invention.

We claim:

1. A device for accommodation in a housing and moving a gas at subatmospheric pressure, the device comprising:
    a rotor and a stator wherein the stator axially surrounds the rotor with a space for relative rotation formed therebetween;
    first and second screwthread-like structures in tandem axially along at least one of the rotor and stator respectively for moving the gas upon relative rotation between the rotor and stator and for forming a viscous seal therebetween; and
    thermal insulation means for thermally insulating the stator from the housing.

2. The device of claim 1, wherein the stator is constructed like a bushing between the rotor and housing and separate from the housing, and wherein there is an annular clearance between the housing and the bushing-like stator.

3. The device of claim 2, wherein the thermal insulation means further comprises O rings or metal seals having a low enough heat-transfer coefficient for substantially maintaing the thermal insulation.

4. The device of claim 3, wherein the masses of the rotor and stator are approximately equal.

5. The device of claim 3, wherein the thermal insulation means further comprises a portion of the bushing-like stator between each O ring and the rest of the stator of sufficiently-small cross section for aiding the thermal insulation.

6. The device of claim 5, wherein the masses of the rotor and stator are approximately equal.

7. The device of claim 2, wherein the bushing-like stator comprises support elements projecting from the stator for supporting it in the housing.

8. The device of claim 7, wherein the masses of the rotor and stator are approximately equal.

9. The device of claim 7, wherein the thermal insulation means further comprises a portion of the bushing-like stator between each support element and the rest of the stator of sufficiently-small cross section for aiding the thermal insulation.

10. The device of claim 9, wherein the masses of the rotor and stator are approximately equal.

11. The device of claim 9, wherein the support elements project from opposite end faces of the bushing-like stator and the portion of the bushing-like stator is defined by axial and radial grooves cooperatively extending sufficiently thereinto for making the portion resilient.

12. The device of claim 11, wherein the masses of the rotor and stator are approximately equal.

13. The device of claim 3, wherein the masses of the rotor and stator are approximately equal.

14. The device of claim 1 wherein the masses of the rotor and stator are approximately equal.

15. The device of claim 1, and further comprising means for connecting a fore-vacuum to the space between the rotor and stator between the structures for moving the gas and forming the viscous seal and for connecting the other side of the viscous seal to atmosphere.

16. The device of claim 15, wherein the space between the rotor and stator has a minimum dimension and the first and second structures also have a minimum clearance from the stator which has a corresponding dimension.

17. The device of claim 1, wherein the space between the rotor and stator has a minimum dimension and the first and second structures also have a minimum clearance from the stator which has a corresponding dimension.

* * * * *

UNITED STATES PATENT AND TRADEMARK OFFICE
CERTIFICATE OF CORRECTION

PATENT NO. : 4,797,062

DATED : January 10, 1989

INVENTOR(S) : Ludger Deters et al Giacomo Sciortino

It is certified that error appears in the above-identified patent and that said Letters Patent is hereby corrected as shown below:

Column 1, lines 44 and 45, "DOS 22 555 618" should read --DOS 22 55 618--.

Column 2, line 28, "mesasure" should read --measure--.

Column 4, line 53, "3" should read --2--.

Signed and Sealed this

Fifteenth Day of May, 1990

*Attest:*

HARRY F. MANBECK, JR.

*Attesting Officer*     *Commissioner of Patents and Trademarks*